United States Patent [19]

Brown et al.

[11] Patent Number: 4,775,541

[45] Date of Patent: Oct. 4, 1988

[54] ION EXCHANGE METHOD OF TREATING LIQUID FERMENTATION PRODUCTS TO REDUCE THE CONTENT OF COLORING MATTER THEREIN

[75] Inventors: Sand T. Brown, Lakeland; John R. Derrick, Jr., Auburndale; C. Byron Smith, Lake County, all of Fla.

[73] Assignee: Mitco Water Laboratories, Inc., Winterhaven, Fla.

[21] Appl. No.: 906,824

[22] Filed: Sep. 12, 1986

[51] Int. Cl.$^4$ .............................................. C12H 1/04
[52] U.S. Cl. ................... 426/271; 426/330.4; 426/592; 210/670
[58] Field of Search ............ 426/592, 271, 253, 330.4; 210/651, 670, 672, 663, 669

[56] References Cited

U.S. PATENT DOCUMENTS

| | | | |
|---|---|---|---|
| 2,413,784 | 1/1947 | Rawlings | 210/670 |
| 2,682,468 | 6/1954 | Frampton | 426/271 |
| 3,347,785 | 10/1967 | Staats | 210/672 |
| 3,437,491 | 4/1969 | Peterson et al. | |
| 3,762,948 | 10/1973 | Morton et al. | 210/670 |
| 3,985,648 | 10/1976 | Casolo | 210/669 |
| 4,083,779 | 4/1979 | Combe et al. | 210/651 |
| 4,151,079 | 4/1979 | Horembala | 210/672 |
| 4,156,026 | 5/1979 | Gogel | 426/592 |
| 4,205,092 | 5/1980 | Mattick et al. | 426/271 |
| 4,260,388 | 4/1981 | Mirabel | 426/250 |
| 4,320,009 | 3/1982 | Hilton et al. | 210/651 |
| 4,414,231 | 11/1983 | Ficca | 426/271 |
| 4,500,556 | 2/1985 | Langston | 426/250 |
| 4,522,836 | 6/1985 | Dechow et al. | 426/599 |
| 4,666,721 | 5/1987 | Norman et al. | 426/599 |

FOREIGN PATENT DOCUMENTS 1217171  1/1968  United Kingdom .............. 210/672

OTHER PUBLICATIONS

Bio Rad Product Price List 1975 p. 1-7 and 10-15.
Watanabe 1971 J. of Society of Brewing 66 (10) 997 Abstract only.
Amano 1970 Bulletin of the Research Institute of Fermentation 14, 15-22 Abstract only.
Mattick 1981 American J. of Enology and Viticulture 32(4) 297 Abstract only.

Primary Examiner—Donald E. Czaja
Assistant Examiner—Carolyn Paden
Attorney, Agent, or Firm—Mason, Fenwick & Lawrence

[57] ABSTRACT

Liquid natural fermentation products, such as wines, are treated to reduce the content of coloring matter therein without substantially deleteriously affecting the other vinous qualities thereby by the steps of passing the liquid product through a granular bed of a strongly basic macro-porous anion exchange resin in hydroxyl form to substantially increase the alkalinity of such liquid product, then passing the more alkaline liquid product through a granular bed of a strongly acidic cation exchange resin in hydrogen form to generally restore its acidity, and recovering the thus-treated liquid product.

6 Claims, No Drawings

ION EXCHANGE METHOD OF TREATING LIQUID FERMENTATION PRODUCTS TO REDUCE THE CONTENT OF COLORING MATTER THEREIN

FIELD OF THE INVENTION

This invention relates to a method for the ion exchange treatment of liquid natural fermentation products, especially wines, and is concerned more specially with a method for substantially reducing the content of coloring matter present in such products following natural fermentation and which impart color thereto by means of an ion exchange resin treatment which does not destroy the other desirable qualities of such product, such as its natural acidic pH and vinous qualities, especially its fruity bouquet and taste.

BACKGROUND OF THE INVENTION

Although there is a natural tendency to associate wine-making almost entirely with grapes and occasionally berries, such as blackberry, a moment's reflection on familiar home-made wines such as "dandelion wine" leads to the obvious and accurate conclusion that a wine-like product can be obtained by the natural fermentation of a great variety of natural sources.

Now, it happens that the production of orange and like juices by the citrus industry results in substantial amounts of solid by-products, particularly pulp and peel, which have in the past been used as much as possible as cattle food for want of any other more advantageous use. This solid citrus waste is well adapted for fermentation into wine-like liquids, and with the increasing popularity of the so-called "citrus wine coolers", i.e., mixtures of citrus juices and inexpensive wine to form a low alcoholic proof beverage, efforts have been made to utilize this by-product from the citrus industry for the production of the wine constituent of these coolers. However, wines produced in this way tend to be characterized by rather unattractive and unappealing coloration of a dark reddish brown nature which tends to distract from the esthetic attraction of such wines. Although the citrus wine coolers themselves need not necessarily be of water-white transparency, rather tending generally to have a pale to medium yellow or orange coloration corresponding to the type of citrus fruit juice employed therein, it is difficult if not impossible to achieve this desirable coloration when directly using wines fermented from citrus waste products. It is more advantageous from the standpoint of the manufacturers of such coolers to use a water-white wine component and achieve the desired mild citrus coloration by means of the citrus juice itself, augmented if need be with known food colors so that the desired low intensity coloration can be easily controlled.

It is, of course, possible to subject the liquid fermentation products from this type of fermentation, as with any other fermentation product, to distillation to recover higher proof alcoholic media, but the distillation product naturally tends to lose much of the desirable wine type characteristics of the undistilled liquid such as its body, its pleasant citrusy aroma or bouquet, as well as its wine-like perception to the palate, all of which as well as less-definable qualities being collected under the term "vinosity". Wines produced from citrus waste products if freed from their unpleasant and unattractive coloration would, therefore, offer potential as a low proof generally colorless alcoholic medium for admixture with higher proof distillation products so as to achieve a final proof level, in addition to their use in formulating wine coolers.

Finally, the market prospects are potentially exciting for wine type beverages derived from the fermentation of more conventional media such as grapes and various berries, but processed so as to remove significant amounts of the natural coloration therefrom while leaving undisturbed the unique desirable qualities of vinosity other than coloration. For example, one could imagine adapting a traditional burgundy wine along the so-called "blush" lines that are currently heavily in vogue in the marketplace particularly with young adults, the term "blush" denoting a pale, pinkish coloration or, in another instance, producing a raspberry or blackberry wine or if fortified with higher proof natural spirits, a "brandy" of either water-white transparency or, if preferred, a slight pinkish or "blush" aspect.

DESCRIPTION OF THE PRIOR ART

It is known in the art to employ ion exchange techniques in the decolorization and demineralization of sugar solutions produced by the sugar industry. Such processes have been extensively investigated in this industry and a considerable amount of literature generated on the subject. Representative of such literature are the following: U.S. Pat. No. 2,785,998 to Harding and Breeder, issued Mar. 19, 1957; "Sugar Decolorization with Anion-Exchange Resins" by Andrus, *Sugar and Azucar*, May 1967; and "Use of Highly Basic Resins in Sugar Refining" by Conklin and Congelose, *Proceedings of the Sixth Technical Technical Session on Bone Char*—1959, copyright 1961, Bone Char Research Projects, Inc. c/o Revere Sugar Refinery, 333 Medford St. Charlestown 29, Mass.

Obviously, however, sugar solutions have virtually nothing in common with liquid natural fermentation products, and the make-up of color matter contained therein is thus believed to be quite different from the make-up of the color content of wines and similar natural fermentation products. In any event, the decolorization of sugar solutions does not involve the need to preserve any of the natural complex odor and taste qualities of such solutions since such qualities are not present to any perceptible degree so that the problem of preserving the original vinosity, other than color, of the liquid being treated does not exist in the treatment of sugar solutions.

It is also known to utilize ion exchange in the so-called "stabilization" of wines. It has long been recognized that wines contain significant amounts of tartrate and bi-tartrate compounds which while soluble at room temperature or above become insoluble when the wine is chilled, thus depositing out as a precipitate and imparting an undesirable cloudy haze to the wine. A direct technique for overcoming this problem has been simply to subject the wine to pre-chilling during manufacture so that the hazy precipitate can be separated, e.g., by filtration, and the final bottled wine no longer contains the haze-producing constituents. However, such pre-chilling can unfavorably influence the vinosity of the wine and may preferably be avoided. Inasmuch as the haze-forming tartrates and bi-tartrates and principally compounds of potassium, magnesium and calcium, the art has perceived the possibility of using ion exchange to extract these insolubilizing cations and replace them with a more soluble cation such as sodium. Here again, considerable research has been directed to this subject, and the following are typical research papers on the subject: "Studies on the Stabilization of Fermented Beverages by Ion Exchange Resin" by Amano and Kagami, J. Ferment. Technol. Vol 47, No. 9, p. 596–602, 1959; "Wine Stabilization by Ion Exchange, Column Technology and Current Resins", by Dickinson, prepared for the Dec. 4, 1967 meeting of The Technical Advisory Committee of the Wine Institute; and "Technical Bulletin" IE-36-50, "Wine Stabilization by Columnwise Exchange Treatment", February 1958, Rohm and Haas Co., Washington Square, Philadelphia 5, Pa.

Various areas of expermentation with ion exchange resins in wine-making, including stabilization, were summarized in the July, 1956 (No. 35) issue of the Technical Bulletin "Amber-Hi-Lites" published by Rohm and Haas Co. of Philadelphia 5, Pa. The first, said to be described in a British patent not identified, aimed at wine stabilization using "a strongly acidic cation exchanger such as Amberlite IR-120 . . . [involved] passage of the wine through a column of resin in the sodium form, either before, during or after addition of sulfur dioxide. The exchange process replaces troublesome potassium ions with sodium ions in order to prevent cold-induced deposits, while addition of sulfur dioxide stabilizes ion exchange treated wine to a greater degree. In outlining the exchange process, this patent claims that the resin beads absorb into their pores neither the bouquet and taste substances in the wine nor alcohol molecules. By using the cation exchange resin in the sodium form, these inventors minimize any lowering of pH in the wine."

In an alternative method "[i]n addition to cation exchange to remove offending potassium ions [other] wine-makers also employ a weakly basic porous anion exchanger to reduce color solids without effecting substantial change in pH. They are also evaluating use of a hydrogen cycle cation exchanger to lower the pH in low acidity wines, which tend to develop haze, and to remove amino acids that encourage bacteria growth. Following cation exchange, these wine-makers pass the wine through a strong base anion exchanger such as Amberlite IRA-400 in order to absorb bacteria."

On the other hand, a French expert ". . . favors hydrogen cycle cation exchange followed by anion exchange with a strongly basic anion exchanger like Amberlite IRA-400. He contends that the effluent from a sodium cycle will contain Seignette salt (potassium sodium tartrate) which influences the taste [and] also questions the legality of adding sodium to the wine.'- 'Among the limitations on this latter approach is the fact that ". . . the degree of acidity produced by replacement of potassium ions by hydrogen ions must be restored to that which would have been reached after refrigeration and storage."

In another area concerning the removal of metal ions such as iron and copper, ". . . [two California wine-makers] tested hydrogen and potassium cation exchange cycles. They reported that wine passed through cation exchange resins in the hydrogen form became objectionably sour to taste and lost most if not all of its original fruity bouquet. Less effective in removing copper, potassium cycles run by these investigators caused a slight initial rise in pH, followed by a return to the original acidity. In a third experiment using Amberlite IR-4B in the tartrate form, they found that the resin apparently complexes both copper and iron, but the wine was partially decolorized."

Also, in this second area, "After working with hydrogen and potassium cation exchange cycles separately, [two] Italians carried out a series of batch treatments combining small amounts of resins in both forms. Using equal amounts of potassium and hydrogen form resins, each in the ratio 1:100 by weight with the wine, they succeeded in maintaining constant while reducing iron content from 42 to 9 milligrams per liter. [They] observed no change in color and taste and commented that the wine had become very bright."

These observations are obviously inconclusive even in their primary areas of concern, and they especially fail to throw helpful light on the subject of decolorization of wine and the like.

OBJECTS OF THE INVENTION

The object of the present invention is an effective ion exchange treatment for at least substantially reducing the coloration of liquid natural fermentation products, including intensely colored grape and berry wines as well as citrus-based wines, without substantially deleteriously affecting the other desirable vinous qualities of such products such as body, aroma and taste, or reducing the alcoholic content thereof.

Another object of the invention is an ion exchange treatment for decolorizing liquid fermentation products, i.e., wines, which is capable of rendering even intensely and deeply colored types of such products of virtually water-white transparency.

SUMMARY OF THE INVENTION

In accordance with the invention, a normally colored acidic liquid fermentation product such as wine derived from citrus, including generally solid citrus waste by-products, grapes, berries and the like is passed, first, through a granular bed of a strongly basic anion exchange resin in hydroxide form and, second, through a separate granular bed of a strongly acidic cation exchange resin in hydrogen form. In passing through the first and anionic resin bed, the pH of the liquid product becomes substantially alkaline, preferably achieving a pH of at least about 11, and the coloration thereof is substantially diminished. Then, passage through the second and cationic resin bed reduces the pH of the liquid product from its elevated alkaline level to an acidic condition generally corresponding to the starting acidity thereof and additional coloring matter is removed. Preferably, the liquid product to be treated is subjected to preliminary filtration in order to extract therefrom as much as possible of the suspended solid particulate material thereof and thus increase the useful life of the resin beds by reducing the rate at which the resin beds become fouled or clogged with such solid material. Preferably, the filtration is in two stages: first through a sub-micron filter membrane having openings of about 0.2–0.5 micron, and second through a granular bed of carbon, neither of which in themselves are significantly effective in reducing the coloration as contrasted with turbidity.

LIQUID NATURAL FERMENTATION PRODUCTS TO BE TREATED

The present process was developed particularly for the decolorization of citrus based wines. As already suggested, these wines are derived by the natural fermentation of the solid waste by-products, mainly pulp and peel, from the extraction of juice from citrus fruit, particularly oranges; and this process has proven to be highly effective for that purpose. However, this process has also been found to be applicable to other types of wines than citrus base wines and has been carried out with more or less equal resul-s with such other wines as those derived from grapes, cherries, berries, passion fruit, and other fruit. Consequently, the instant process is considered to be of general application to any wine type product obtained by the natural fermentation of virtually any fruit which product contains visible coloration desired to be removed and, moreover, is characterized by the unique wine-like qualities of body, aroma and taste.

The details of the fermentation process itself form no part of the present invention and arewell known in the art. In general, a mash obtained by mixing water with the solid waste products in some cases or in other cases the juice alone extracted from the starting raw materials is allowed to ferment typically under controlled conditions in the absence of oxygen and with the fermentation initiated by a special yeast type inoculant until the fermentation has reached the desired end point in terms of alcoholic content, usually around 14 or 15%. Natural fermentation is subject to an inherent limiting factor when the content of alcohol becomes sufficiently high as to inhibit further action by the active micro-organism. In general, this occurs at approximately 14-15%. The fermentation liquid is then separated from the solid dregs and processed according to accepted wine-making technology which again plays no part in the present invention. The point in the wine-making operation at which the present process is carried out can certainly vary but will ordinarily be at an early stage following fermentation. Thus, one of the first steps is to subject the new wine to so-called amelioration which essentially denotes dilution with pure deionized water in order to adjust the fusel oil content of the wine to the desired level. In the citrus wine industry, wine that has been ameliorated but not processed further is referred to as a "less than standard" citrus wine, and wines at this stage are convenient subjects for the present treatment. Thereafter, citrus wines are given a fortification involving the addition of a higher proof brandy so as to achieve a desired final alcoholic content of around 20% by volume or 40 proof. Such a fortified citrus wine is identified as a "standard" citrus wine and also qualifies for the present treatment although no advantage is seen in delaying the decolorization of this invention until after fortification.

The fusel oil content varies with different types of wines. For example, a "less than standard" citrus based wine might have a typical fusel oil content in the general range of 180–250 ppm, while a typical fusel oil content for a red wine might be about 400 or higher. It has been found that the ion exchange treatment of the present invention does effect a certain reduction in the fusel oil content, depending upon its starting level. As a rule, wine by industry standards must possess a minimum fusel oil content of at least 26 parts per million, and for the most part the products of the present invention do exhibit a remaining fusel oil content above this level, generally above about 90 ppm.

The coloring matter in the starting materials for the present process vary in origin according to the type of fermentation product in question. For example, the coloring matter in citrus based wines as well as in red grape based wines is derived from the peel or skin as the case may be, which remains present during fermentation; while the coloring content of berry, cherry wines and the like, is supplied by the naturally colored juice alone, the solid residue being usually removed before fermentation. It will be appreciated that the lengthy fermentation process provides an opportunity in either case for the starting coloring components to undergo complex chemical reactions so that the chemical identity of the ultimate coloring constituents in the fermentation product may well differ somewhat from that of the coloring constituents in the starting material.

The coloring matter in the starting natural fermentation liquid products, also referred to as "color bodies" or chromaphores, undoubtedly of complex chemical structure, is similar to cartenoids and flavenoids. In general, they fall into two primary structural categories; namely, those which are aliphatic in nature, being in the form of an open chain or the like, and those which are aromatic in character and contain one or more benzene nuclei. The coloring matter extracted by the present process appears to be primarily of the aromatic type, but no attempt has been made to identify the precise structure of specific components of coloring matter being removed because such precise chemical identification as far as can be determined plays no part in the present concept. Thus, as already mentioned, this process has been generally successful in removing to a substantial degree the coloring matter or color bodies in wines derived from grapes and berries such as blackberries and raspberries, as well as citrus base wines, and the color bodies present in such different kinds of wines must vary considerably in their chemical structure.

It appears that the color bodies present in wines and like natural fermentation products are predominantly non-ionic in character, 85–90% being believed to be non-ionic; and it might be supposed that such color bodies would not, therefore, be responsive to ion exchange treatment which by definition is applicable to materials capable undergoing dissociation and ionization at least to some degree. Quite remarkably, however, it has been discovered that not only are the color bodies in natural fermentation products responsive to ion exchange treatment (although possibly responsive in a different way from normal ion exchange), but in fact their successful removal appears to require an environment of ion exchange as a critical factor. The theoretical mechanism involved is by no means clearly understood at present, but it does appear that the color body molecules, while non-ionic in character, do possess a bi-polar moment with one end being more positively charged and the other end more negatively charged, and are attracted to the surface of the ion exchange resin granules by the interaction of their respective surface forces, such as van der Waals, hydrophilic or hydrophobic bonding and hydrogen bonding forces. It is believed that when such attraction occurs in the context of an ion exchange environment, the color body molecules due to their bi-polar structure tend to undergo alignment so that the molecules are arrayed end-to-end with adjacent ends relatively oppositely charged in more or less parallel fashion and that the attraction of the resin surface for the color bodies is substantially multiplied or enhanced under such conditions. Giving support to this theory it has been demonstrated, for example, that so-called polymeric absorbent resins which posses a similar physical structure to the resin used here but lack ion exchange activity are distinctly ineffective for the removal of color bodies in accordance with the present invention. Thus, while an ion exchange mechanism as such can hardly be the direct cause of the results achieved here, the only actual exchange of ions being with respect to such ions as calcium, magnesium and the like usually present in the treatment liquids in question and which occurs only incidentally in the present process, it is essential that the treatment resins have strong ion exchange activity as subsequently described.

PREFERRED PRELIMINARY FILTRATION TREATMENT

The starting liquid fermentation products here will ordinarily contain a significant content of suspended organic matter which imparts turbidity thereto. This suspended organic matter can be extracted during the ion exchange treatment in the course of passage through the respective beds of ion exchange resins but such extraction results in fouling of the resin beds which reduces their useful life, despite the fact that such removal is of a purely physical entrapment as opposed to the electrical attraction of an actual ion exchange mechanism, so that the resin bed must be replaced much earlier than would otherwise be the case. In order to avoid this premature fouling of the resin beds, it is preferred that the starting liquid product be treated so as to separate as much of the suspended, turbid matter therefrom in advance of passage through the respective resin beds. A preferred first preliminary step is filtration of the starting liquid product through a sub-micron filter membrane having openings generally in the range of about 0.2–0.5 micron. Then, the filtered liquid product is passed through a granular bed of activated charcoal which again acts as a physical absorbent to trap and extract suspended solid matter.

Experimentation with each of these filtration steps in the course of the development of the present invention revealed that neither of them nor a combination of them as such are effective to achieve the ultimate objective of the invention of an at least near-complete reduction in the color bodies contained in the starting liquid product. Thus, it has been established that although sub-micron filter membranes are capable of removing extremely finely divided particles such as bacteria and even certain viruses, they are not capable of retaining the color bodies found in liquid natural fermentation products. Similarly, experimentation with beds of activated charcoal in particle form even of considerably increased bed depth, up to 60 inches, does not result in removing substantially all of the color body content. With such massive amounts of carbon, it is possible to accomplish a considerable reduction in color bodies, increasing for example the optical transmission from a starting level of about 50% for citrus base wine up to about 80% at most, but the cost of such reduction would be prohibitive in actual practice. Furthermore, even under these exaggerated conditions, achievement of water-white clarity, corresponding to a slight perceptible colored tinge or pastel tint to an otherwise clear medium, has proved impossible.

Although the charcoal filtration is not adequate alone, it is a useful and desirable adjunct to the present process. Thus, using economically feasible bed depths of carbon, a small amount of the color bodies, perhaps up to about 20–25% which proportion happens to be mainly constituted by higher molecular weight color body materials is removed. The higher molecular weight fraction is the main cause of fouling of the resin beds, and its removal by the charcoal allows the resin bed to function against the lower molecular color bodies for which they are peculiarly adapted.

Present governmental standards impose a maximum limit on the amount of carbon that can be employed per thousand gallons of liquid product to be treated of nine pounds, and the carbon bed preferably satisfies this maximum relative level at a bed depth of around 18–30 inches at a mesh size of about 12×40. Increased bed depths do not show a corresponding increase in efficiency.

In contrast to the respective ion exchange resins, the granular charcoal bed is not capable of regeneration. Once a given charcoal bed has become fouled, i.e., substantially clogged with separated solid matter, it must be discarded and replaced with fresh bed material. Preferably, the activated carbon is pre-treated before use in the present process by soaking the same in de-ionized water overnight. Such pre-treatment facilitates penetration of the liquid product to be treated into the pores of the carbon granules. If the several treatment beds are arranged in series in a common column, the liquid flow rate through the carbon bed will obviously be determined by the permissible flow rate through the resin beds, especially since the flow rate through the cation resin bed normally tends to be the slowest and thus the limiting factor. However, a suitable flow rate through the carbon bed may correspond to about 14 gal/ft$^3$ of carbon granules.

A preferred activated carbon is available under the trade name MITCARB HA from Mitco Water Laboratories, Inc., Winter Haven, Fla., and has the following physical specifications and properties:

|  | Minimum Specifications | Typical Properties |
| --- | --- | --- |
| Mesh size | 12 × 40 | — |
| Iodine Number-mg/gm | 1000 min. | 1040 |
| Molasses Number | 200 min. | 220 |
| Abrasion Number (Ro-Tap) | 70 min. | 75 |
| Mean Particle Diameter-mm | 0.9–1.1 | 1.0 |
| Apparent Density-gm/cc | 0.44 min. | 0.45 |
| Back Washed & Drained Density | 25#/cu.ft. | 25 |
| Moisture, as packed | 2.0% max | 1.0 |
| Water Soluble Ash | 0.5% max. | 0.1 |

THE ION EXCHANGE SYSTEM

The ion exchange system of the present invention utilizes two stages, one anionic and one cationic, through which the liquid product, preferably after the pretreatment filtration steps described above, is passed in sequence. The respective beds can be contained in separate treatment columns or more preferably, arranged in serial order in a single common column, and in either case, it is advantageous to have a duplicate arrangement so that one side can undergo regeneration while the other is involved in active processing.

The order or sequence in which the liquid product is passed through the two beds is of critical importance to the successful practice of the invention. Thus, the liquid product must be passed through an anionic resin bed first and then through a cationic resin bed in order to achieve substantial decolorization of the treatment liquid without destroying its vinous characteristics apart from color. If the sequence of passage through the beds were to be reversed, the desired results would not be achieved. In particular, the final pH of the treated liquid product would be decidedly on the alkaline side which would seriously and unacceptably detract from its taste as a wine.

A. First Resin Stage

As stated, the first resin stage is of the anionic type, and it is necessary that the anionic resin be strongly basic in nature and be utilized in the hydroxyl form. Strongly basic anionic resins are often available in the chloride form; and if the manufacturer is unable to supply the same resin in the hydroxyl form, the chloride form must be initially converted to hydroxyl form by treatment with a suitable solution of sodium hydroxide or other strong base. If the resin were to be employed in the chloride form, its effect on the treatment product would be to introduce hydrochloric acid, imparting a distinctly and unacceptably high level of acidity to the product which destroys its desirable taste qualities. Furthermore, the chloride form of the anionic resin has proven to be ineffective in removal of the color bodies from the liquid product being treated.

Strongly basic anionic resins which have been used with good results here have been in the macroporous form, as contrasted with the gel form, the term "macroporous" denoting the presence in the resin bead of myriad pores or voids extending therethrough which greatly increase the effective surface area of the resin beads and contribute to increased efficiency of decolorization. It is believed that the gel form of such resin would in principle be effective to at least some degree, but at the present time a suitable gel form of a strongly basic anionic resin is not commercially available. Consequently, it has been impossible to actually test a gel form of this type of resin under actual working conditions.

Two macroporous strongly basic anionic resins which are commercially available and have given good working results in this process are Amberlite IRA-900 and Amberlite IRA-958. Amberlite IRA-900 is a macroreticular strongly basic anion exchange resin which embodies fixed, large pores, presenting a sponge-like matrix different from the gelular structure of many other anion exchange resins. Its strong base functionality makes possible the efficient removal of anions while its large pore size promotes removal of larger size organic molecules. Amberlite IRA-958 is essentially similar in character but has larger size pores than the 900. Typical physical and chemical properties for these two resins are set forth below, and more complete details as to such properties as well as the recommended operating characteristics and conditions for the same can be found in the following technical bulletins published by their manufacturer Rohm and Haas Compsny, Philadelphia, Pa. 19105: Amberlite IRA-900 "Engineering Notes", No. IE-112-67/78, March 1984, and Amberlite IRA-958 "Technical Bulletin", IE-273, March 1982.

| IRA-900 | |
| --- | --- |
| Ionic Form (as supplied) | Chloride |
| Shape | Spherical Particles |
| Moisture Content | approximately 60% |
| Density | 40.0 to 45.0 lbs/ft$^3$(640 to 720 g/l) |
| Shipping Weight | 42 lbs/ft$^3$(672 g/l) |
| Effective Size | approximately 0.53 mm. |
| Screen grading (wet) | 16 to 50 mesh (U.S. Standard Screens) |
| Uniformity Coefficient | 1.8 maximum |
| Fines Content | Less than 1% through a 50 mesh U.S. Standard Screen |
| Swelling | Approximately 20% upon complete conversion from the chloride to the hydroxide form |
| Total Exchange Capacity | |
| (a) Volumetric | 1.0 meq/ml, minimum 21.8 Kgrs/ft$^3$ as CaCO$_3$ 3.1 lbs-eq/ft$^3$, 49.9 g CaCO$_3$/l |
| (b) Weight | 4.2 meq/g of resin in chloride form, minimum |
| Temperature Limitation | |
| OH Form | 140° F. or 60° C. |
| Other Forms | 170° or 77° C. |

| IRA-958 | |
| --- | --- |
| Ionic Form (as supplied) | Chloride |
| Shape | Spherical |
| Moisture Content | 66–72% |
| Density | 42 lbs/ft$^3$ |
| Shipping Weight | 42 lbs/ft$^3$ (672 g/l) |
| Effective Size | 0.52 mm |
| Screen Grading (wet) | 16 to 50 mesh (U.S. Standard Screens) |
| Uniformity Coefficient | 1.8 maximum |
| Fines Content | Less than 2% through a 50 mesh U.S. Standard Screen |
| Bed Swelling | Approximately 20% upon complete conversion from the chloride to the hydroxide form |
| True Wet Density | 1.07 g/cm$^3$ |
| Total Exchange Capacity | |
| (a) Volumetric | 0.8 meq/ml, minimum |
| (b) Weight | 4.1 meq/g of resin in chloride form, minimum |
| Temperature Limitation | |
| OH Form | 100° F. |
| Other Forms | 170° F. |
| Shrinkage | 20% |

The anionic resins as supplied by the manufacturer need to receive a pretreatment to render them acceptable for food usage. Their manufacturing process tends to leave a residual amine type odor which should be removed before the resins are actually employed in the present method. The recommended pretreatment can be found in the respective technical bulletins identified above, but a typical pretreatment consists of three cycles of exhaustion and regeneration of the anionic resin each of 48 minutes duration with a 0.5% sodium chloride and 5% caustic solution, respectively, at a suitable flow rate, for example, 0.25–0.5 gal/min/ft$^3$ resin. Then the resin bed preferably was highly regenerated for 48 minutes with five bed volumes of 5% caustic solution applied at a flow rate of 0.5 gal/min/ft$^3$ resin, and finally rinsed with deionized water until the conductivity thereof had fallen below 10 micro mho. After such pretreatment, the resin is ready for use in the present process.

The effect on the raw or new wine of passage through the first anionic stage is a substantial increase in the alkalinity of the wine effluent. Indeed, this increase in alkalinity can be taken as an indication of the effectiveness of the anionic first stage treatment inasmuch as a close correlation appears to exist between the achieved alkalinity and the extent of reduction of the color body content of the raw wine. From a starting pH well on the acid side, usually in the range of about 3–3.5 pH, specifically pH 3.2–3.4, the pH of the wine effluent from the anionic first stage should be at least pH 11 and preferably somewhat higher arund pH 12. As the anionic resin becomes exhausted by passage of the raw wine therethrough, a reduction in the pH from this elevated level will be detected; and when the wine effluent pH has dropped below about pH 10, or possibly even slightly higher, passage of the wine through the anionic first stage should be discontinued until that stage is regenerated. This end point for the operating pH will be confirmed by the increase in coloration of the wine effluent from that stage, i.e., the optical transmission or clarity of the effluent wine will drop as the elevated pH drops.

When the wine effluent from the anionic first stage has fallen below the end point of about pH 10, the anionic first stage needs to be subjected to regeneration, and the recommended specification for carrying out regeneration is available from the manufacturer of the selected resin, e.g., in the technical bulletins referred to above. A typical working regeneration procedure would be along the following lines. The resin bed is first backwashed for about 15 minutes and then contacted for regeneration purposes with a 4% caustic solution for at least 48 minutes and preferably longer since the longer the contact the more complete the regeneration. Then the bed is slow rinsed with deionized water for 15 minutes and finally subjected to a fast water rinse to reduce its conductivity to below 30 micro mhos.

Despite the action of the carbon prefiltration step in extracting the bulk of the organic suspended matter from the raw liquid prior to passage through the ion exchange resin beds, a certain residual content of suspended matter remains in the liquid and is collected in the anionic stage which unavoidably acts to some extent as an organic trap. Hence, after a considerable period of operation, say 3–4 complete cycles of exhaustion by the wine being treated and regeneration or about 10,000 or more gallons of treated wine, the anionic first stage becomes fouled with the collected organic matter. An important feature of the present method is the availability of a purification or cleansing technique for removing this collected suspended matter from the anionic first stage resin so that the same resin can be reused for additional treatment cycles. Because the problem of anionic bed fouling seems unavoidable in the treatment of liquid natural fermentation products as contemplated here, unless cleansing of the fouled anionic bed were possible, the fouled bed would have to be discarded as useless which would materially decrease from the cost effectiveness of this process and perhaps render it economically unfeasible. Quite fortuitously, however, cleansing of the anionic bed is possible by a fairly straightforward procedure as follows. Preferably employing the regeneration effluent from the cationic second stage as the liquid medium, the fouled anionic bed is backwashed at its usual flow rate for about 10 minutes and then drained to bed level. Air is next bubbled into the bed by means of a so-called air-lance for about 30 minutes at a rate of 4 cubic feet of air per minute per cubic foot of resin bed, causing an agitation or stirring of the bed. Air-lancing is followed by another backwash at the regular flow rate for 20 minutes and draing to bed level. For each cubic foot of resins, 10 gallons of a solution containing 10 pounds of sodium chloride and 1 pound of caustic per each 10 gallons is added to the bed, the solution being heated to a temperature not higher than 140° F. The solution is drained to bed level after one hour and then allowed to soak for two to three hours or longer, e.g., overnight. After completion of the soaking, the resin bed is rinsed by a downflow of rinse water at the rate of 2 gal/min per cubic foot of resin over a period of 15 minutes. If the resin bed has not at this point been restored to its normal generally uncolored condition from its darkened almost black fouled condition, this sequence of steps should be repeated. Once the resin bed appears clean, it is backwashed at the regular flow rate for 10 minutes and then subjected to a regular regeneration procedure twice so as to prepare it for further use in the instant process.

In general, the IRA-958 resin is characterized by larger size pores than is the IRA-900 resin and slight differences in the effectiveness of these two resins can be observed. While neither of these resins alters the desirable vinosity of the products being treated to an objectionable degree, it does appear that the IRA-900 resin tends to remove slightly some of the aroma and taste components of the liquid product; whereas the IRA-958 resin, in distinct contrast, appears to emphasize or exaggerate these qualities of taste and aroma in the wine effluent.

A typical treatment capacity for the anionic first stage up to the point of needing regeneration is about 40–50 gallons of treated wine (effluent) for cubic foot of resin. The corresponding capacity of the cationic second stage is considerably higher by a factor of perhaps 4–6 or more times. The flow rates through the anionic bed (which will normally be the same as that through the cationic stage bed) is specified by the manufacturer but will usually be in the general range of 1–3 gal/min/ft$^3$ of resin, say about 2–2.5 gal/min/ft$^3$ of resin in practice. As the wine passes through the anionic resin bed, certain effects appear to occur. If the wine contains calcium, magnesium and like cations, these combine chemically with the hydroxyl groups released from the resin forming the corresponding hydroxide which may show up as a kind of flocculant or precipitant. In addition, chloride atoms in the wine are replaced by hydroxyl groups which accounts for the signficant increase in the alkalinity of the wine effluent from the anionic state.

More important, the molecules of the color bodies are attracted to the surface of the resin granules or beads by mutually interacting surface forces arising from their dipole moment, and are apparently caused to assume an alignment particularly favorable to such attraction and retention. Because these surface forces are relatively weak, it is possible to influence the release of these molecules during regeneration of the anionic resin with a regenerating solution which is attracted by stronger ionic forces; namely, the hydroxyl ions.

B. Second Resin Stage

The second stage resin must be a strongly acidic cationic ion exchange resin in the hydrogen form. Generally, this type of resin is available in either the sodium or the hydrogen form, but only the hydrogen form has been found effective for this process. If the process were to be carried out using the same resin in the sodium form, the pH of the effluent from the cationic second stage would undergo an increase due tothe combination of the sodium atoms from the resin with hydroxyl groups in the water present, imparting an objectionable taste to the wine effluent.

The preferred strongly basic anionic resins have a macroporous or macroreticular structure and exemplary resins of this kind include DUOLITE C-25D, DOWEX HGR-W2 and Amberlite 200. DUOLITE C-25D is available from Diamond Shamrock Chemical Co., 1901 Spring Street, Redwood City, Calif. 94063 and is described in a technical leaflet from that company having the number DDL-25, November 1969. It is prepared by solfonating a styrene-divinylbenzene copolymer to form a copolymer matrix of high porosity combined with good structural strength. DOWEX HGR-W2 is available from Dow Chemical U.S.A., Midland, Mich. 48640 and is described in a technical bulletin identified as T.D. Index 140.02 (Form No. 177-1321-78). This resin is also a sulfonated styrene-dinyl benzene copolymer of improved physical stability. Amberlite 200 is available from Rohm and Haas Company identified above, being described in technical bullet No. IE-127-67, November 1974. It, too, is a sulfonated styrene-divinylbenzene copolymer of macroreticular structure which possesses high chemical and physical stability. The typical physical properties for these respective resins are listed below.

| DUOLITE C-25D | |
|---|---|
| Composition | Sulfonated copolymer of styrene and divinylbenzene |
| Appearance | Tan, opaque beads |
| Structure | Macroporous |
| Nominal crosslinking | 5.5% |
| Moisture content (Na form) | 55–60% |
| Effective pH range | 1–14 |
| Volume change, H/Ma form | 1.04 |
| Maximum operating temperature | 220° F. |
| Total exchange capacity, | |
| Equivalents per liter | 1.7 |
| Kilograins per cu ft | 37 |
| Operating capacity and leakage | See FIGS. 3–39 |
| Apparent density, lbs/cu.ft, as shipped | 51 |
| Specific gravity (Moist Na form) | 1.28 |

| U.S. Std. Sieve No. | Range, % | Typical, % |
|---|---|---|
| +16 | 0–6 | 1.9 |
| −50 | 0–0.7 | 0.1 |

| DOWEX HGR-W2 | | |
|---|---|---|
| Physical Form | Hard, spherical beads | |
| Sphericity | 95% Min. | |
| Original | Na+ Form | H+ Form |
| Water Retention Capacity | 40–43% | 47–50% |
| Shipping Weight lbs/cu.ft | 54 | 51 |
| Minimum Capacity | | |
| meq/g dry resin | 4.35 | 4.75 |
| meq/ml wet resin | 2.2 | 2.0 |
| Kgr/cu.ft as calcium carbonate | 48.0 | 43.6 |
| Color Throw, APHA No. | 20 | 40 |
| Specific Gravity | 1.31 | 1.22 |
| Friability-gm/bead minimum for | | |
| 95% of beads | >200 | >200 |
| average | >350 | >350 |
| Standard Screen Size (Wet) | | |
| on 16 mesh, max | 2% | 2% |
| Through 40 mesh, max | 1% | 1% |
| Screen Index Range | 300–450 | 300–450 |

| Amberlite 200 | |
|---|---|
| Ionic Form: | Sodium |
| Shape: | Spherical particles |
| Density: | 48 to 52 pounds per cubic foot (determined by backwashing and draining in a two-inch diameter column) |
| Shipping Weight: | 50 pounds per cubic foot |
| Moisture Content: | 46 to 51 percent |
| Screen Grading (Wet): | 16 to 50 mesh (U.S. Standard Screens) |
| Effective Size: | 0.40 to 0.50 millimeters |
| Uniformity Coefficient: | 2.0 maximum |
| Fines Content: | 2 percent maximum through 50 mesh (U.S. Standard Screens) |
| Physical Stability: | Strongly resistant to breakdown |

The cationic resin can have gelular form and in that form gives useful but less desirable results. An example of a gelular strongly acidic cationic exchange resin is Amberlite IRA-120 Plus which is of the sulfonated polystyrene type also available from Rohm and Haas Company. The specifications for the use of this resin are described in technical data sheet No. IE-169-70/80 January 1982 and Technical Bulletin No. IE-123-67, September 1972 published by that company. Typical physical properties are as follows:

| Amberlite IRA-120 Plus | |
|---|---|
| Ionic Form (as supplied) | Sodium or Hydrogen |
| Shape | Spherical Particles |
| Moisture | 44 to 48 percent |
| Density | 48 to 54 lbs/cu.ft |
| Shipping Weight | 53 lbs/cu.ft |
| Effective size | 0.45 to 0.60 mm |
| Screen Grading (Wet) | 16 to 50 mesh (U.S. Standard Screens) |
| Uniformity Coefficient | 1.8 maximum |
| Fines Content | 0.7 percent maximum through 50 mesh U.S. Standard Screens |

Among the operating details given by these sources are the suggested regeneration conditions but a typical regeneration procedure for the cationic second stage resin would be along the following lines. First, the exhausted cation bed is given a 15 minute backwash followed by a contact period of 45 minutes or longer with a 5–10% solution of hydrochloric acid to effect its regeneration. The bed is then given a slow rinse with water for 15 minutes and a final fast water rinse until its conductivity is below 100 micro mhos and preferably about 30 micro mhos. The cationic bed is considerably less susceptible to organic fouling than is the anionic bed due to its downstream position relative to the carbon prefiltration bed and the anionic bed. However, after a considerable period of operation equal to at least three cycles of exhaustion by the wine being treated and regeneration or approximately once every 17,000 gallons of production, the cationic bed is preferably subjected to a cleansing procedure. This involves washing the cationic bed at that stage with regeneration effluent from the anionic bed, i.e., cross-regeneration, without air bubbling as applied during the anionic bed cleansing, followed by a regular regeneration sequence to prepare the bed for continued processing.

As might be expected, the gelular form of the cationic resin lacks the durability of the macroporous form, tending to become soft after a considerable period of treatment and hence liable to fracture which reduces the effectiveness of its bed. The gelular IRA 120 Plus resin, on the other hand, is known to possess a higher ion exchange capacity as such while the IRA-200 resin is the most highly cross-linked of the three macromolecular resins mentioned as examples.

The effect of the cationic second bed in terms of decolorization is additive or complementary with the decolorizing action of the anioic first bed. In some instances, the anionic bed alone will achieve almost an optimal level of color body reduction, but the addition of a cationic second stage nevertheless is important in bringing the final product up to an optimal level. In other cases, the anionic-treated wine will retain a considerable amount of coloration so that subsequent cationic processing becomes of critical significance in these instances in order to reach substantial elimination of the color body content from the wine product.

In passing through the cationic second stage, the wine is converted from its distinctly alkaline condition following the anionic first stage treatment to an acidic stage and the cationic treatment should be such as to achieve such conversion to a substantially complete degree, that is, to restore the final wine effluent to an acidity more or less comparable to its natural acidity before the present treatment, typically 3.2-3.4. Preferably, the final pH of the wine effluent from the cationic stage serves as the indicator for completion of the process in that if the wine effluent pH, after remaining at a level of about 3-3.5 and in the vicinity of starting pH of the raw wine should begin to rise during operation above that level and especially above about pH 4, then this is taken as an indication that the cation resin in the second stage has become essentially exhausted of its ion exchange capacity so as to require regeneration.

The minimum optical transmision (% T) or clarity of the final treated product will vary somewhat with the type of product, e.g., wine, being processed. Generally, the optical transmission should exceed about 80%. However, at this level, significant coloration remains albeit, much reduced from that of the starting raw wine. Hence, at least about 90% T is much preferred and at least 95% T is optimum.

Miscellaneous

The further processing of the treated wine product resulting from the present invention as described above forms no part of that invention and is selected according to the intended end use of the product. Thus, the product where, for example, a less than standard citrus base wine was treated, might then be subjected to fortification by admixture with a neutral orange brandy to predetermined alcoholic content of about 20% by volume. It could be sold as thus fortified or the fortified product could be taken and diluted with a citrus juice so as to achieve a citrus wine cooler. Other variations are equally possible as will be known to those involved in formulating such products.

EXAMPLES

Introduction

Various experimental tests were carried out in the laboratory in order to demonstrate the effect on several different types of commercially available raw or new wine products of a treatment executed in accordance with the present invention using different strongly basic anionic and strongly acidic cation ion exchange resins. In general, these experiments were carried out in small glass columns of one-half to two inches in diameter depending upon readily available sizes. The wine to be treated was in all instances filtered by means of a submicron filter membrane or equivalent of about a 0.4 micron opening size or less down to a 0.2 micron where turbidity persisted following filtration with a larger size membrane. The filtered wine was then passed through an activated carbon pretreatment stage bed of 18-30 inches height to absorb a significant amount of the residual organic matter therefrom, and for this purpose, a selected amount of activated carbon was arranged in the treatment column supported on a porous or fritted glass disc or the like above a petcock by means of which the throughput rate could be controlled. Selected amounts of the chosen anionic and cationic resins were respectively similarly loaded into columns, but in this instance, a wad of cotton was superimposed over the porous glass disc inasmuch as in the absence of this protective cotton layer, the fine pores of the disc rather quickly became clogged so as to interfere with the course of the experiment. Gravity-fed flow as used in these laboratory experiments, but in practice on a larger scale, flow might better be under the control of a positive displacement pump or the like. A given amount of the selected pretreated raw wine was passed through the anionic and cationic resin colùmns in that order. Generally, the height of the resin beds was at least about 10-14 inches, and the diameter of the treatment columsn was selected with this height in mind given the predetermined quantity of resin to be treated, i.e., for amounts of resin around 25 ml, the column diameter was, say one-half inch, and for intermediate resin volume, a column of one inch was suitable, while for larger columes above about 100 ml, the column diameter was, say 2 inches.

In order to more easily observe for changes in the behavior of the wine being processed during the course of each stage treatment, the effluent from each stage was usually divided into aliquot portions of 100 or 50 ml depending on the starting volume. Each of these aliquot portions was typically analyzed for various properties particularly pH and percent optical transmission (% T) as measured by a commercial instrument designed for this purpose. The wavelength of light used in such measurement could be adjusted and was set at 432 nm for citrus based wine and 525 nm for red wine. As a rule, an optical transmission value of 95% denotes a crystal clear or water white product, although occasionally a very faintly perceptible tint appeared to be present in an otherwise clearly transparent medium. In some instances, samples were analyzed for total organic carbon content (TOC—mg/l) by a commercial instrument capable of carrying out such a measurement. The total organic carbon content includes all organic carbon from all sources, e.g., sugars, as well as those attributable to color bodies, and this value naturally does not correlate directly with the change in the content of color bodies achieved by this process. However, it does tend to generally confirm a reduction in the color body content at least within a given example even though it does not allow for meaningful extrapolation between examples. In some instances the content of fusel oil was measured by high pressure liquid chromatography, and the content of ions such as magnesium, calcium, iron and copper was determined by means of an atomic analyzer available in commerce. Where these analytical values are absent, they either were not determined or were omitted for sake of brevity. Unless otherwise noted, the aliquots from each stage were combined into a composite, for which similar analyses were made, and the composite was then subjected to further stage processing where appropriate.

EXAMPLE NO. 1

Citrus-based Wine

| | Conditions |
|---|---|
| Pretreat stage | 6.4 grams of activated carbon |
| Anionic stage | 25 ml of Rohm and Haas IRA-900 in hydroxide form |
| Cationic stage | 25 ml of Rohm and Haas IRA-120 Plus in Hydrogen form |
| Material to be treated | 1000 ml of less than standard wine with a 58% transmission quality and a pH of 3.20 |
| Flow rate | 25 gals/min/ft$^3$ resin for all stages |

Results:

| | % Transmission | | | pH | | |
|---|---|---|---|---|---|---|
| Effluent Aliquots/ml | After Carbon Pretreat | After Anionic Stage | After Cationic Stage | After Carbon Pretreat | After Anionic Stage | After Cationic Stage |
| 100 | 81% | 91% | 98% | | 12.2 | 3.2 |
| 200 | | 87% | 98% | | 11.4 | 3.2 |
| 300 | 71% | 86% | 98% | | 11.3 | 3.2 |
| 400 | 85% | 87% | 98% | | 11.4 | 3.17 |
| 500 | 80% | 85% | 98% | 3.179 | 11.1 | 3.2 |
| 600 | 78% | 85% | 98% | | 10.9 | 3.3 |
| 700 | 70% | 85% | 98% | 3.22 | 10.9 | 3.3 |
| 800 | 74.5% | 82% | 98% | 3.22 | 10.9 | 3.3 |
| 900 | 66.5% | 84.5% | 98% | 3.22 | 10.9 | 3.3 |
| 1000 | 68% | 78% | 98% | 3.22 | 10.9 | 3.3 |
| Composite of all aliquots | 72% | 84% | | 3.22 | 11.1 | |

Product Characteristcs

Test demonstrated excellent color removal while not disturbing those desired characteristcs of proof and aroma.

EXAMPLE NO. 2

Citrus-based Wine

Parallel comparison of different anionic and cationic resins

| Conditions - Carbon pretreatment and separate anionic stages | |
|---|---|
| Pretreat stage | 82.0 grams of Mitcarb HA |
| Anionic stage No. 1 | 120 ml of Rohm and Haas IRA-900 in hydrogen form |
| Anionic Stage No. 2 | 120 ml of Rohm and Haas IRA-958 in hydrogen form |
| Material to be treated | 2600 ml of less than standard citrus based wine |
| Flow Rates: | 200 ml/min for carbon; 10.7 ml/min for both anion beds |

Results:

| Sample | pH | % T at 432 nm | TOC (mg/l) | Fusel Oil (mg/l) | Ca (mg/l) | Mg (mg/l) | Fe (mg/l) | Cu (mg/l) |
|---|---|---|---|---|---|---|---|---|
| Raw Wine | 4.05 | 53.5 | 67,000 | 187.6 | 195 | 99 | 1.4 | 0.7 |
| Composite After Carbon Pretreat Stage | 4.08 | 59 | 65,4000 | 188.3 | 198 | 102 | 2.3 | 0.6 |
| After Anionic Stage No. 1 - IRA 900 resin 100 ml aliquots | | | | | | | | |
| 1 | 12.7 | 96 | 42,200 | | | | 0.2 | 0.02 |
| 2 | 12.7 | 95 | 46,400 | | | | 0.2 | 0.05 |
| 3 | 12.7 | 80 | 51,600 | | | | 0.2 | 0.10 |
| 4 | 12.7 | 79 | 55,383 | | | | 0.2 | 0.10 |
| 5 | 11.48 | 9$^1$ | 61,836 | | | | 0.2 | 0.40 |
| After Anionic Stage No. 2 - IRA 958 resin 100 ml aliquots | | | | | | | | |
| 1 | 12.7 | 95 | 35,800 | | | | 0.2 | 0.02 |
| 2 | 12.7 | 96 | 49,900 | | | | 0.2 | 0.02 |
| 3 | 12.7 | 86 | 53,200 | | | | 0.2 | 0.02 |
| 4 | 12.7 | 71 | 54,700 | | | | 0.2 | 0.30 |
| 5 | 9.76 | 1$^1$ | 62,900 | | | | 0.2 | 0.50 |

| Conditions - Separate cationic stages | |
|---|---|
| Cationic Stage No. 1 - | 20 ml of Rohm and Haas IR-120 Plus in hydrogen form |
| Cationic Stage No. 2 - | 20 ml of Rohm and Haas 200 in hydrogen form |
| Material to be treated - | 800 ml of wine effluent that has been passed through both anionic beds, i.e. composite of all |

| | | | | -continued | | | | |
|---|---|---|---|---|---|---|---|---|
| Flow rates: | | aliquots 5.4 ml/min for both cationic beds | | | | | | |

| | | | | Results: | | | | |
|---|---|---|---|---|---|---|---|---|
| Sample | pH | % T at 432 nm | TOC (mg/l) | Fusel Oil (mg/l) | Ca (mg/l) | Mg (mg/l) | Fe (mg/l) | Cu (mg/l) |
| Composite from both anoin stages | 12.5 | 81 | 46,402 | 110.9 | 76.5 | 14.3 | 0.2 | 0.03 |
| After Cationic Stage No. 1 - IRA 120 Plus resins 50 ml aliquots | | | | | | | | |
| 1 | 3.3 | 99 | | | | | | |
| 2 | 2.9 | 99 | | | | | | |
| 3 | 2.9 | 99 | | | | | | |
| 4 | 2.9 | 99 | | | | | | |
| 5 | 2.9 | 99 | | | | | | |
| 6 | 2.8 | 99 | | | | | | |
| 7 | 2.8 | 99 | | | | | | |
| 8 | 2.8 | 98[2] | | | | | | |
| After Cationic Stage No. 2 - IRA 200 resin 50 ml aliquots | | | | | | | | |
| 1 | 2.9 | 98 | | | | | | |
| 2 | 2.8 | 98 | | | | | | |
| 3 | 2.8 | 98 | | | | | | |
| 4 | 2.9 | 98 | | | | | | |
| 5 | 2.9 | 98 | | | | | | |
| 6 | 2.9 | 98 | | | | | | |
| 7 | 2.9 | 98 | | | | | | |
| 8 | 2.9 | 97[2] | | | | | | |
| Composite After Both Cation Stages | 2.9 | 98 | 42,657 | 92.2 | 0.3 | 0.07 | 0.1 | 0.02 |

[1]Both columns experienced serious clogging apparently due to Ca/Mg hydroxide flocculant in this run and attempts to dislodge the flocculant resulted in breakthrough of the beds which could not be repaired
[2]Neither cationic stage was exhausted at these several volumes of liquid being treated

EXAMPLE NO. 3

California Red Grape Wine—Burgundy Colored

| Rohm and Haas Amberlite IRA-958 followed by Amberlite 200 | |
|---|---|
| | Conditions: |
| Pretreat stage | 82.0 grams of Mitcarb HA Carbon |
| Anionic stage No. 1 | 120 ml of Rohm and Haas IRA-958 in hydroxide form |
| Anionic stage No. 2 | 20 ml of Rohm and Haas 200 in hydrogen form |
| Material to be treated | 1600 ml of red wine |
| Flow rate: | 133 ml/min across carbon; 10.7 ml/min across the anionic bed; 5.4 ml/min across the cationic bed (all proportionate to 2.5 gal/ft$^3$ of bed) |

| | | | | Results: | | | | |
|---|---|---|---|---|---|---|---|---|
| Sample | pH | % T at 525 nm | TOC (mg/l) | Fusel Oil (mg/l) | Ca (mg/l) | Mg (mg/l) | Fe (mg/l) | Cu (mg/l) |
| Raw Wine | 2.4 | 33 | 58,526 | 407.6 | 13.5 | 3.9 | 5.4 | 0.0 |
| Composite After Carbon Pretreat Stage | 3.0 | 56 | 53,812 | 107.2 | 101 | 16.5 | 4.7 | 0.0 |
| After Anionic Stage - IRA 958 resin 100 ml aliquots | | | | | | | | |
| 1 | 11.1 | 100 | | | | | | |
| 2 | 11.7 | 99 | | | | | | |
| 3 | 11.6 | 99 | | | | | | |
| 4 | 11.6 | 98 | | | | | | |
| 5 | 11.6 | 99 | | | | | | |
| 6 | 11.6 | 99 | | | | | | |
| 7 | 11.7 | 97 | | | | | | |
| 8 | 11.7 | 97 | | | | | | |
| 9 | 11.7 | 99 | | | | | | |
| 10 | 11.7 | 98 | | | | | | |
| 11 | 11.7 | 99 | | | | | | |
| 12 | 11.7 | 98 | | | | | | |

-continued

| Rohm and Haas Amberlite IRA-958 followed by Amberlite 200 | | | | | |
|---|---|---|---|---|---|
| 13 | 11.7 | 97 | | | |
| 14 | 11.6 | 98 | | | |
| 15 | 11.5 | 97 | | | |
| 16 | 11.3 | 95 | | | |
| Composite After Anionic Stages | 11.6 | 97 | 49,043 | 65 | 4.4 |
| After Cationic Stage Amberlite 200 resin 100 ml aliquots | | | | | |
| 1 | 3.4 | 97 | | | |
| 2 | 3.4 | 97 | | | |
| 3 | 3.4 | 97 | | | |
| 4 | 3.4 | 97 | | | |
| 5 | 3.4 | 97 | | | |
| 6 | 3.4 | 97 | | | |
| Composite After Cationic Stages | 3.4 | 97 | 50,874 | 3.2 | 0.13 |

EXAMPLE 4

Passion Fruit Wine

| Conditions: | |
|---|---|
| Pretreat stage | 8.3 grams of Mitcarb HA |
| Anionic stage | 45 ml of Rohm and Haas IRA-900 in hydroxide form |
| Cationic stage | 20 ml of Rohm and Haas 200 in hydrogen form |
| Material to be treated | 500 ml of passion fruit wine |
| Flow rates: | 30 ml/min across the carbon bed; 4.0 ml/min across the anion bed; 5.4 ml/min across the cation bed |

Results:

| Sample | pH | % T at 432 nm | Fusel Oil (mg/l) |
|---|---|---|---|
| Composite After Carbon Pretreat Stage | 3.1 | 61 | |
| After Anionic Stage IRA 900 resin 30 ml aliquots | | | |
| 1 | 13.0 | 98 | |
| 2 | 12.8 | 99 | |
| 3 | 12.7 | 97 | |
| 4 | 12.5 | 71 | |
| 5 | 5.58[3] | 60 | |
| Composite After Anionic Stage | 12.6 | 93 | |
| After Cationic Stage - Amberlite 200 resin 30 ml aliquots | | | |
| 1 | 3.1 | 100 | |
| 2 | 3.0 | 100 | |
| 3 | 3.0 | 100 | |
| 4 | 3.0 | 100 | |
| 5 | 3.0 | 100 | |

[3]Breakthrough occurred

EXAMPLE NO. 5

Passion Fruit Wine

| Conditions: | |
|---|---|
| Pretreat stage | 8.3 grams of Mitcarb |
| Anionic stage | 45 ml of Rohm and Haas IRA-958 in hydroxide form |
| Cationic stage | 20 ml of Rohm and Haas 200 in hydrogen form |
| Material to be treated | 500 ml of passion fruit wine |
| Flow rates: | 30 ml/min across the carbon bed; 4.0 ml/min across the anion bed; 5.4 ml/min across the cation bed |

Results:

| Sample | pH | % T at 432 nm | Fusel Oil (mg/l) |
|---|---|---|---|
| Composite After Carbon Pretreat Stage | 3.1 | 61 | |
| After Anionic Stage 30 ml aliquots | | | |
| 1 | 12.6 | 100 | |
| 2 | 12.7 | 98 | |
| 3 | 12.6 | 93 | |
| 4 | 12.4 | 52 | |
| 5 | 7.7[4] | 26 | |
| Compositive After 958 | 12.6 | 97 | |
| After Cationic Stage 30 ml aliquots | | | |
| 1 | 3.5 | 100 | |
| 2 | 3.4 | 100 | |
| 3 | 3.4 | 100 | |
| 4 | 3.4 | 100 | |
| 5 | 3.4 | 100 | |

[4]Breakthrough occurred

EXAMPLE NO. 6

Cherry Base Wine

| Conditions: | |
|---|---|
| Pretreat stage | 8.3 grams of Mitcarb HA |
| Anionic stage | 45 ml of Rohm and Haas IRA-900 in hydroxide form |
| Cationic stage | 20 ml of Rohm and Haas 200 in hydrogen form |
| Material to be treated | 500 ml of cherry wine |
| Flow rates: | 30 ml/min across the carbon bed; 4.0 ml/min across the anionic bed; 5.4 ml/min across the cationic bed |

Results:

| Sample | pH | % T at 535 nm | TOC (mg/l) | Fusel Oil (mg/l) |
|---|---|---|---|---|
| Composite After Carbon Pretreat After Anionic Stage 30 ml aliquots | 3.68 | 1 | 60,209 | |

-continued

| | | |
|---|---|---|
| 1 | 12.3 | 37[5] |
| 2 | 12.6 | 10 |
| 3 | 12.5 | 4.5 |
| 4 | 12.3 | 3 |
| 5 | 11.9 | 2 |
| 6 | 11.7 | 1 |
| After Cationic Stage 30 ml aliquots | | |
| 1 | 3.29 | 87 |
| 2 | 3.07 | 93 |
| 3 | 3.05 | 78 |
| 4 | 3.06 | 66[5] |
| 5 | 2.87 | 60 |
| 6 | 2.99 | 41 |
| 7 | 3.07 | 41 |
| 8 | 3.04 | 37 |
| 9 | 3.14 | 27 |
| 10 | 4.35 | 26 |
| 11 | 4.41 | 8 |
| 12 | 5.13 | 9 |
| Composite of Cationic Stage | 3.62 | 50 | 7,894 |

[5]Amounts of both ion exchange resins too low for this wine; should be increased for better % T.

EXAMPLE No. 7

Cherry Wine

Conditions:
Pretreat stage: 8.3 grams of Mitcarb HA
Anionic stage: 45 ml of Rohm and Haas IRA-958 in hydroxide form
Cationic stage: 20 ml of Rohm and Haas 200 in hydrogen form
Material to be treated: 500 ml of cherry wine
Flow rate: 30 ml/min across the carbon bed; 4.0 ml/min across the anion bed; 5.4 ml/min across the cation bed Results:

| Sample | pH | % T at 535 nm | TOC (mg/l) | Fusel Oil (mg/l) |
|---|---|---|---|---|
| Composite After Carbon Pretreat | 3.6 | 1 | 60,209 | |
| After Anionic Stage 30 ml aliquots | | | | |
| 1 | 12.3 | 99 | | |
| 2 | 12.5 | 81 | | |
| 3 | 12.4 | 67 | | |
| 4 | 12.2 | 19[6] | | |
| 5 | 11.7 | 6 | | |
| 6 | 11.2 | 2 | | |
| After Cationic Stage 30 ml aliquots | | | | |
| 1 | 3.59 | 100 | | |
| 2 | 3.38 | 97 | | |
| 3 | 3.25 | 90 | | |
| 4 | 3.09 | 78 | | |
| 5 | 3.12 | 72 | | |
| 6 | 3.14 | 64 | | |
| 7 | 3.11 | 63 | | |
| 8 | 3.25 | 59 | | |
| 9 | 3.22 | 50 | | |
| 10 | 3.05 | 48 | | |
| 11 | 3.26 | 44 | | |
| 12 | 3.67 | 34 | | |
| Composite of Cationic Stage | 3.16 | 64 | 8,336 | |

[6]Volume of resin beds again too low for this wine

EXAMPLE NO. 8

Blackberry Based Wine

Conditions:
Pretreat stage: 8.3 grams of Mitcarb HA
Anionic stage: 45 ml of Rohm and Haas IRA-900 in hydroxide form
Cationic stage: 20 ml of Rohm and Haas 200 in hydrogen form
Material to be treated: 500 ml of blackberry wine
Flow rate: 30 ml/min across the carbon bed; 4.0 ml/min across the anion bed; 5.4 ml/min across the cation bed Results:

| Sample | pH | % T at 432 nm | TOC (mg/l) |
|---|---|---|---|
| Raw Wine | 2.68 | 49 | 30,828 |
| Compositive After Carbon Pretreat | 2.82 | 58 | 30,862 |
| After Anionic Stage 30 ml aliqouts | | | |
| 1 | 11.7 | 86 | |
| 2 | 12.1 | 81 | |
| 3 | 12.08 | 82 | |
| 4 | 12.08 | 87 | |
| 5 | 12.08 | 85 | |
| 6 | 12.07 | 83 | |
| 7 | 12.00 | 80 | |
| 8 | 11.55 | 81 | |
| 9 | 11.36 | 80 | |
| 10 | 11.30 | 78 | |
| 11 | 10.74 | 85 | |
| Compositive After Anionic Stage | 11.89 | 85 | 15,857 |
| After Cationic Stage 30 ml aliquots | | | |
| 1 | 3.76 | 96 | |
| 2 | 3.60 | 91 | |
| 3 | 3.60 | 92 | |
| 4 | 3.54 | 93 | |
| 5 | 3.47 | 90 | |
| 6 | 3.35 | 85 | |
| 7 | 3.24 | 84 | |
| 8 | 3.17 | 88 | |
| 9 | 3.19 | 82 | |
| 10 | 2.97 | 85 | |
| Compositive After Cationic Stage | 3.46 | 88[7] | 23,124 |

[7]Had darkish tint perceiptible to the eye. Both stages should be repeated for better clarity.

EXAMPLE NO. 9

Blackberry Wine

Conditions:
Pretreat stage: 8.3 grams of Mitcarb HA
Anionic stage: 45 ml of Rohm and Haas IRA-958 in hydroxide form
Cationic stage: 20 ml of Rohm and Haas 200 in hydrogen form
Material to be treated: 500 ml of blackberry wine
Flow rates: 30 ml/min across the carbon bed; 4.0 ml/min across the anion bed; 5.4 ml/min across the cation bed

| Sample | pH | % T at 535 nm | TOC (mg/l) |
|---|---|---|---|
| Raw wine | 2.68 | 49 | 30,282 |
| Composite After Carbon Pretreat | 2.82 | 58 | 30,862 |
| After Anionic Stage 30 ml aliquots | | | |
| 1 | 11.85 | 94 | |

| | | |
|---|---|---|
| 2 | 12.08 | 88 |
| 3 | 12.08 | 93 |
| 4 | 12.09 | 95 |
| 5 | 12.07 | 96 |
| 6 | 12.03 | 95 |
| 7 | 11.70 | 93 |
| 8 | 11.36 | 90 |
| 9 | 11.20 | 85 |
| 10 | 9.97 | 83 |
| 11 | 6.47 | 84 |
| Compositive After Anionic Stage | 11.78 | 92 | 24,270 |
| After Cationic Stage | | | |
| 30 ml aliquots | | | |
| 1 | 3.77 | 100 |
| 2 | 3.52 | 97 |
| 3 | 3.51 | 96 |
| 4 | 3.48 | 96 |
| 5 | 3.38 | 95 |
| 6 | 3.33 | 93 |
| 7 | 3.26 | 90 |
| 8 | 3.23 | 82 |
| 9 | 3.04 | 81 |
| 10 | 2.87 | 75 |
| Compositive After Cationic Stage | 3.42 | 96 | 22,426 |

EXAMPLE NO. 10

Pilot Trial

In view of the successful laboratory experiments, a pilot trial was carried out using as the anionic stage resin IRA-900 in hydroxyl form and for the cationic stage IRA-120 Plus in hydrogen form. The wine processed was citrus base wine derived from the fermentation of citrus juice concentrates. Filtration of the raw wine through special filtration equipment gave a turbidity free raw product with a transmission quality of about 58%. The filtered raw wine was passed at a flow rate of 5 gallons per minute through a 1¼ cubit foot chamber of activated carbon, through an anionic chamber containing twelve cubic feet of anionic resin, and then through a cationic chamber containing five cubic feet of cationic resin. The resulting product was a clear, water white wine of 98% transmission quality or better and a suitable pH, with good vinous characteristics. The wine was processed in repetitive runs of 300 to 400 gallons throughput to suit the capacity of the pilot unit. The following data is representative of the results obtained from these runs.

| Sample | pH | % T at 432 nm | TOC (mg/l) |
|---|---|---|---|
| Raw Wine | 3.5 | 76 | 75,008 |
| After Anioic Stage | 12.38 | 86 | 68,646 |
| After Cationic Stage: | | | |
| At Beginning of Run | 2.86 | 99 | 67,638 |
| At End of Run | 2.88 | 99 | 70,595 |
| Compositive of Entire Product Run | 2.89 | 99 | 76,858 |

COMPARATIVE EXAMPLES

Introduction

During the development of this process, experiments were carried out using ion exchange resins which do not satisfy the criteria for the resins useful in this invention and which did not give acceptable product quality. These tests are included as comparative examples as follows:

COMPARATIVE EXAMPLE A

Anionic Stage Resin in Weak Base Form

| Conditions | |
|---|---|
| Pretreat stage | 6.4 grams of Activated Carbon (GAC #1240) |
| Anionic stage | 25 ml of Duolite A-7 in weak base form |
| Cationic stage | 25 ml of Duolite C-25-D in hydrogen form |
| Material to be treated | 1000 ml of less than standard wine with 58% transmission and a pH of 3.20 |
| Flow rate | 2.5 gal/min/ft$^3$ for all stages |

| | Results | | | |
|---|---|---|---|---|
| | % Transmission | | pH | |
| Effluent Aliquots/ml | After Carbon Pretreat | After Anionic Stage | After Carbon Pretreat | After Anionic Stage |
| 100 | 81% | 76.5% | | |
| 200 | | | | |
| 300 | 71% | 73.5% | | |
| 400 | 85% | 76.5% | | |
| 500 | 80% | 72.0% | 3.179 | 3.4 |
| 600 | 78% | 70.5% | | 3.57 |
| 700 | 70% | 70.0% | 3.22 | 3.52 |
| 800 | 74% | 70.0% | 3.22 | |
| 900 | 66.5% | 70.0% | 3.22 | |
| 1000 | 68.0% | 70.0% | 3.22 | |
| Composite of all aliquots | 72% | 76.5% | 3.20 | 3.22 |

Product Characteristics

Passage of the carbon-protected wine through the anionic resin stage resulted in a low pH that was unacceptable. Odor was bad and color removal was insufficient so test was terminated without cationic resin treatment.

COMPARATIVE EXAMPLE B

Anionic Stage Resin in Chloride Form

| Conditions | |
|---|---|
| Pretreat stage | 6.4 grams of Activated Carbon (GAC #1240) |
| Anionic stage | 25 ml of Rohm and Haas IRA-958 in chloride form |
| Cationic stage | 25 ml of Rohm and Haas IRA-120 Plus in hydrogen form |
| Material to be treated | 1000 ml of less than standard wine with 58% transmission and a pH of 3.20 |
| Flow rate | 25 gals/min/ft$^3$ resin for all stages |

| | Results: | | | | | |
|---|---|---|---|---|---|---|
| | % Transmission | | | pH | | |
| Effluent Aliquots/ml | After Carbon Pretreat | After Anionic Stage | After Cationic Stage | After Carbon Pretreat | After Anionic Stage | After Cationic Stage |

-continued

| | | | | |
|---|---|---|---|---|
| 100 | 81% | 91% | 87% | 2.3 | 1.03 |
| 200 | | 88% | 88% | | |
| 300 | 71% | 87% | | | |
| 400 | 85% | 88% | | | 2.92 |
| 500 | 80% | | | 3.179 | |
| 600 | 78% | 85% | | | |
| 700 | 70% | 85% | | 3.22 | |
| 800 | 74% | 82% | | 3.22 | |
| 900 | 66.5% | 80.5% | | 3.22 | |
| 1000 | 68% | 77% | | 3.22 | |
| Composite of all aliquots | 72% | | | 3.22 | |

Product Characteristics

Product was unacceptable due to taste and low transmission, i.e., excessive coloration, and cationic stage was terminated early.

What is claimed is:

1. A method of reducing the content of coloring matter contained in a generally acidic wine without substantially impairing the natural complex odor and taste of said wine which comprises the steps of: passing said wine through a first granular bed of a strongly basic macro-porous anion exchange resin in hydroxyl form to substantially increase the alkalinity of said wine at least as high as about pH 11, then passing the thus-treated wine with increased alkalinity through a second granular bed of a strongly acidic cation exchange resin in hydrogen form to generally restore the acidity of said wine, and recovering the thus-treated wine.

2. The method of claim 1, including the preliminary step of passing said wine through a granular bed of activated carbon to remove from said wine a fraction of said coloring matter of larger molecular weight.

3. The method of claim 1, wherein said wine is derived from citrus fruit, berries or grapes.

4. The method of claim 1, including the step of discontinuing the passage of said wine through a given bed of said anionic resin when the pH of the wine effluent therefrom drops below to an end point about pH 11 and then subjecting said anionic bed to regeneration with a solution of a strong base in order to restore such anionic bed to useful condition for treating additional quantities of said wine.

5. The method of claim 4 which further comprises alternately passing additional quantities of wine through said anionic resin bed and then regenerating said anionic resin bed as claimed in claim 4 until said anionic resin bed becomes darkened in color due to fouling by organic solids removed from said wine; then cleansing said anionic resin bed by immersing said fouled anionic resin bed in a solution of brine and caustic for a sufficient time to release the collected organic solids therefrom, rinsing said anionic resin bed to remove the brine-caustic solution and released solids, and subjecting the rinsed resin bed to said regeneration; and then passing additional quantities of wine through the thus-cleansed anionic resin bed.

6. The method of claim 1, including the step of terminating the passage of anionic-treated wine through the cationic resin bed when the acidic pH of the wine effluent from the cationic resin bed rises significantly above the general acidity of the starting wine and subjecting the cationic resin bed to regeneration with a solution of a strong inorganic acid to restore the same to useful condition for treating an additional quantity of wine.

* * * * *